April 17, 1962 D. G. RUPLEY 3,030,591

PERIODICALLY FREQUENCY-SWEPT AND BLANKED SIGNAL GENERATOR

Filed Dec. 12, 1960

INVENTOR
DON G. RUPLEY
BY C. F. Weigel, Jr.
ATTORNEY 3,030,591

PERIODICALLY FREQUENCY-SWEPT AND BLANKED SIGNAL GENERATOR

Don G. Rupley, St. Joseph, Mich., assignor to Daystrom Incorporated, Murray Hill, N.J., a corporation of New Jersey Filed Dec. 12, 1960, Ser. No. 75,351
5 Claims. (Cl. 331—172)

Figure 1:
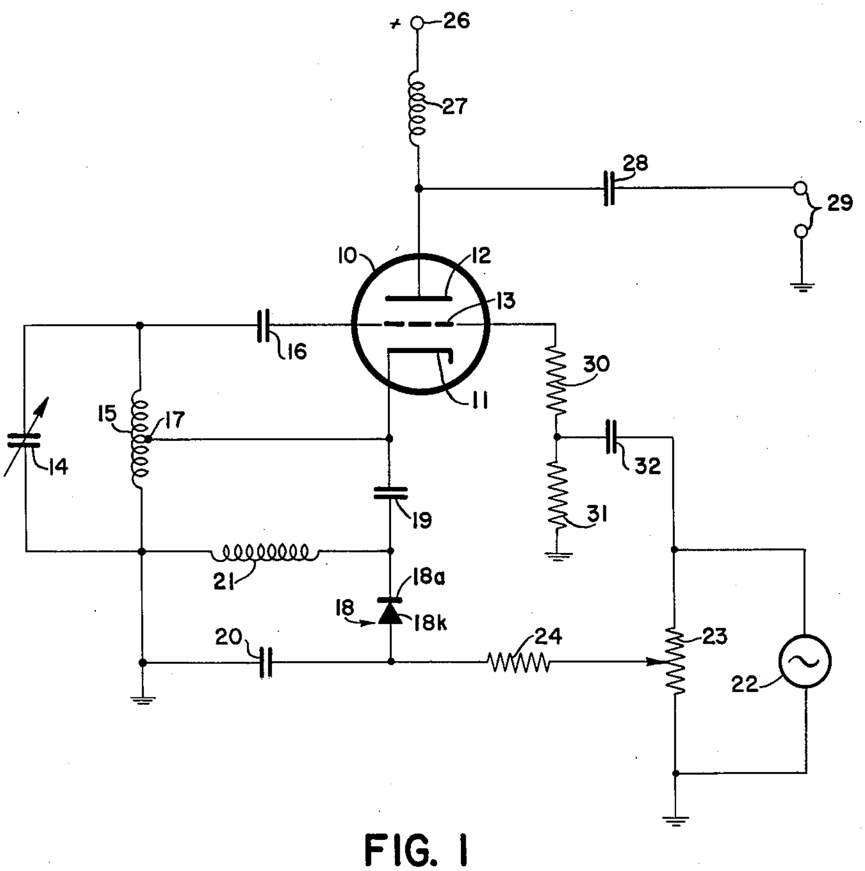

This invention relates to the generation of electromagnetic waves, and particularly to the generation of such waves which are frequency modulated as for example in a sweep signal generator.

Sweep signal generators are, as those knowledgeable in the art are aware, electronic instruments having a signal output which is varied in frequency or "swept" at a predetermined uniform rate. Such apparatus is useful in designing and evaluating the band pass of various electrical networks and is also commonly employed as an alignment signal generator to mention but a few applications.

In order to modulate the oscillator in conventional sweep signal generators either a mechanical or an electrical arrangement is usually employed. A typical mechanical arrangement might include an electric motor for varying the rotor portion of a variable capacitor in the tank circuit of the oscillator at the frequency at which it is desired to modulate the oscillator signal frequency. Electrical arrangements typically utilize relatively elaborate circuitry which might include a reactance or a saturable reactor for varying the frequency of oscillation at the desired rate.

These prior art techniques have inherent disadvantages. In the mechanical arrangement, there are problems such as noise, wear, vibration and maintenance. In addition, this method is quite costly since it usually employs a motor with associated mechanical parts. The electrical method is also costly, both in material and in labor assembly, since it usually involves the use of an additional tube with its circuit employing capacitors, resistors and other components or parts.

Additionally, it is extremely desirable to employ blanking in such sweep signal generators. The importance of blanking can be appreciated from the fact that a generator output signal which is not blanked presents an undesirable double image when the signal is viewed on an oscilloscope connected to the output of a frequency selective network. By providing a blanking potential in the signal generator one of the images is eliminated and the other image is in effect converted to a base reference line, which is a useful and very desirable feature. The prior art circuits for accomplishing this are relatively complex in that they require usually a separate electron discharge device with its associated circuitry.

This invention provides a means for producing a blanked frequency modulated signal which eliminates the above disadvantages.

Accordingly, it is an object of this invention to modulate the frequency of an oscillator by the use of a voltage-sensitive capacitor while blanking a portion of the output signal, all in a manner heretofore unknown.

Another object of this invention is to effect both the modulation of the oscillator frequency and the blanking operation by means of a common control signal.

It is another object to generate a blanked frequency modulated signal in a manner far simpler and less expensive than heretofore known by the use of electronic apparatus which does not employ complex circuitry and numerous components.

Figure 2:
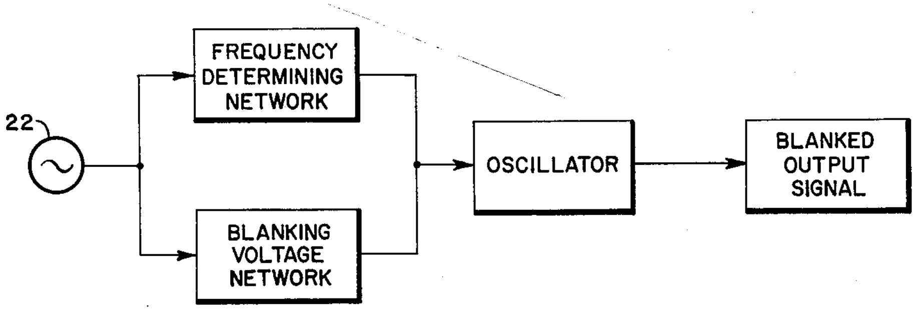

Other objects, features and advantages of my invention will become apparent from a reading of the specification taken in conjunction with the accompanying drawings in which:

FIGURE 1 shows a schematic wiring diagram of a frequency modulated oscillator employing the principles of my invention, and FIGURE 2 is a block diagram of the circuit shown in FIGURE 1.

Briefly, my invention includes an oscillator or generator of electromagnetic waves having a frequency determining network and a blanking voltage network coupled thereto. The frequency determining network includes a unidirectionally conductive device which has the property that the capacitance between its terminals varies in accordance with a variation in the potential applied thereto. A control potential variable in amplitude with respect to time is applied to the terminals of the unidirectionally conductive device for effecting a change in the capacitance of the device in accordance with changes in the potential amplitude. As the capacity of the device is changed, it effects a change in the frequency of the oscillator, i.e., the oscillator is frequency modulated.

The control signal is also connected to the blanking voltage network. This network couples the control potential to the oscillator for the purpose of suppressing or blanking the oscillator signal output for a portion of the sweep cycle.

Referring now to FIGURES 1 and 2, there is an oscillator tube 10 having a cathode or input electrode 11, a plate or output electrode 12 and a grid or control electrode 13. A frequency determining electrical network is provided in the form of an oscillator tank circuit and includes a variable tuning capacitor 14 and an inductance 15 in parallel. This tank circuit is coupled at its upper end to the grid 13 through a capacitor 16. The lower end of the tank circuit is coupled to chassis ground. A tap 17 on the inductance 15 is provided for connection with the cathode 11.

A unidirectionally conductive device 18 which may be a semiconductor diode of the silicon or germanium type for example, is connected in series with a pair of capacitors 19 and 20 across the lower portion of the inductance 15.

A radio frequency choke 21 is provided between the anode **18*a* of the diode 18 and ground to provide a D.C. return path to ground from the anode as will later appear from the description of operation. This choke has a high impedance to the frequency of the tank circuit so as not to effectively short out the path of the oscillator frequency signal through the diode 18 and capacitor 20** which are bridged by this choke.

A control potential source, represented by the symbol 22 is connected across the ends of a voltage divider 23. The potential from this source is represented as an alternating potential but the circuit may be satisfactorily operated with a fluctuating D.C. potential. The arm of the divider 23 is connected through a resistance 24 to the cathode **18*k* of the diode 18**.

Operating D.C. potential for the oscillator tube 10 is applied between a positive terminal 26 and ground, a suitable load impedance such as an inductance 27 being provided between this terminal and the plate 12. A coupling capacitor 28 couples the oscillator output signal to the output terminals 29.

The oscillator signal is blanked by means of the control potential from the source 22 which is coupled to the oscillator grid 13 by means of a blanking voltage network. This network provides the proper blanking potential on the grid 13 and includes a pair of resistors 30 and 31 serially connected between the grid 13 and ground, their common connection being coupled to one terminal of the control potential source 22 through the capacitor 32. The network is connected to the other terminal through ground.

The circuit operates in the following manner. The natural frequency of the oscillator output signal is determined essentially by the capacitance 14 and inductance 15 of the LC tank circuit and would appear at the output terminals 29 unchanged in frequency in the absence of the control signal potential 22. The oscillator is, however, frequency modulated by the action of the potential 22 which causes the diode 18 to become conductive every half cycle. When the diode becomes conductive, a current flows from one terminal of the alternating potential source 22 to the other terminal which through the path comprising a portion of the divider 23, the resistor 24, the diode 18, the choke 21 and chassis ground.

The application of the control potential 22 to the series circuit loop just described causes the capacitance of the diode to vary in accordance with the varying potential between its anode and cathode caused by the varying potential 22. Since the diode is a part of the circuit bridging the lower portion of the tank coil 15 comprising the two capacitors 19 and 20 and the diode 18, the oscillator frequency is changed from its natural frequency by an amount depending upon the change in diode capacitance. The rate of change or frequency of modulation is dependent upon the frequency of the source 22 which is of a much lower frequency than the oscillator frequency. It is convenient in some applications to employ a readily available low alternating potential such as 6.3 volts. The value of the potential applied to the diode determines the sweep width and thus the divider 23 functions as a sweep width control.

In order to eliminate the double oscilloscope image referred to above, I have found that extremely good blanking can be effected for approximately half of the sweep cycle by employing the same control potential 22 for blanking as is used for effecting the sweep. In fact by employing a common control potential for both sweep and blanking, it is possible to blank either at the beginning or end of the sweep cycle with less elaborate circuitry than by using different control potentials or other arrangements for these functions.

The capacitor 32 couples the control potential 22 to the point connecting the resistors 30—31 together. These components comprise the blanking potential network and cooperate to produce the proper potential on the grid 13 to render the tube 10 non-conductive for approximately half of the sweep cycle.

In view of the above teaching, it will be appreciated that it is now possible to achieve a blanked sweep signal generator output by means of a circuit which is far simpler and less expensive than was previously possible. It will be obvious that the principles which I have employed are not limited to circuits utilizing tubes but can also be adapted for transistor operation by those knowledgeable in the art.

Since many changes could be made in the above circuit and many apparently widely different embodiments of this invention could be made without departing from the scope thereof, it is intended that all matter contained in the above description or shown in the accompanying drawings shall be interpreted as illustrative and not in a limiting sense.

I claim:

1. A circuit for producing a frequency modulated signal comprising, an oscillator having a frequency determining network, said network including a unidirectionally conductive device of a type in which the capacitance varies with a variation in the potential across its terminals, a source of control potential varying in amplitude with respect to time coupled to said device for varying the capacity of said device to thereby modulate the frequency of said oscillator, and means for coupling said control potential to said oscillator to periodically suppress a portion of the output signal from said oscillator.

2. The invention set forth in claim 1 wherein said control potential is of an alternating waveform.

3. The invention set forth in claim 1 wherein said unidirectionally conductive device is a semiconductor diode.

4. The invention set forth in claim 1 wherein said means includes a resistance-capacitance network connected between said control potential source and said oscillator.

5. A sweep signal generator comprising, an oscillator having a resonant circuit which includes a semiconductor diode wherein the capacitance between its terminals varies with the potential applied thereto, an alternating control potential source, means for coupling said potential source to said diode to vary the capacitance of said diode in accordance with the variations in said control potential to thereby vary the frequency of said oscillator, and a blanking potential network coupled between said control potential source and said oscillator for rendering said oscillator inoperative for approximately half of the cycle of said alternating control potential.

No references cited.